Fig.6.

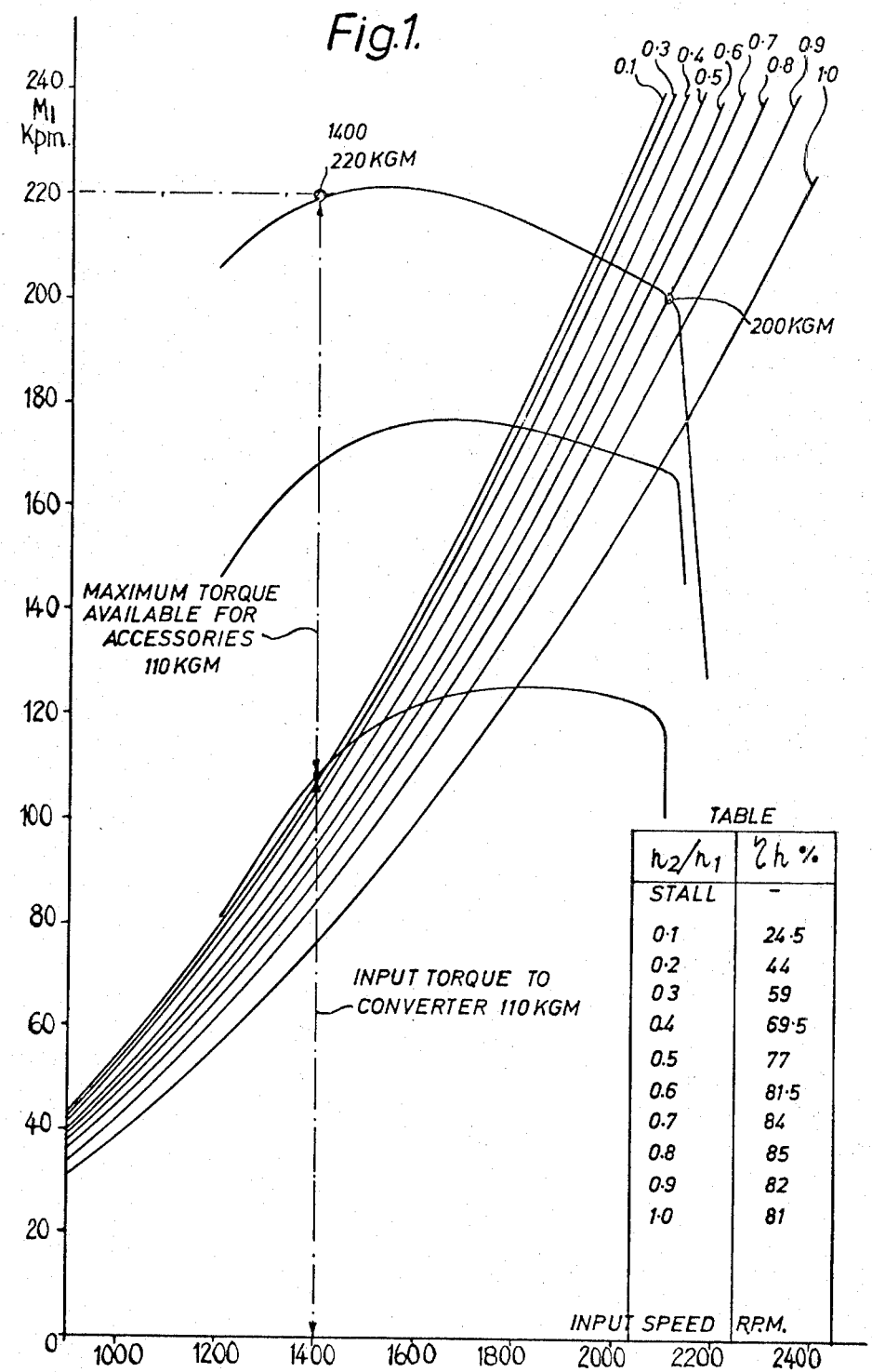

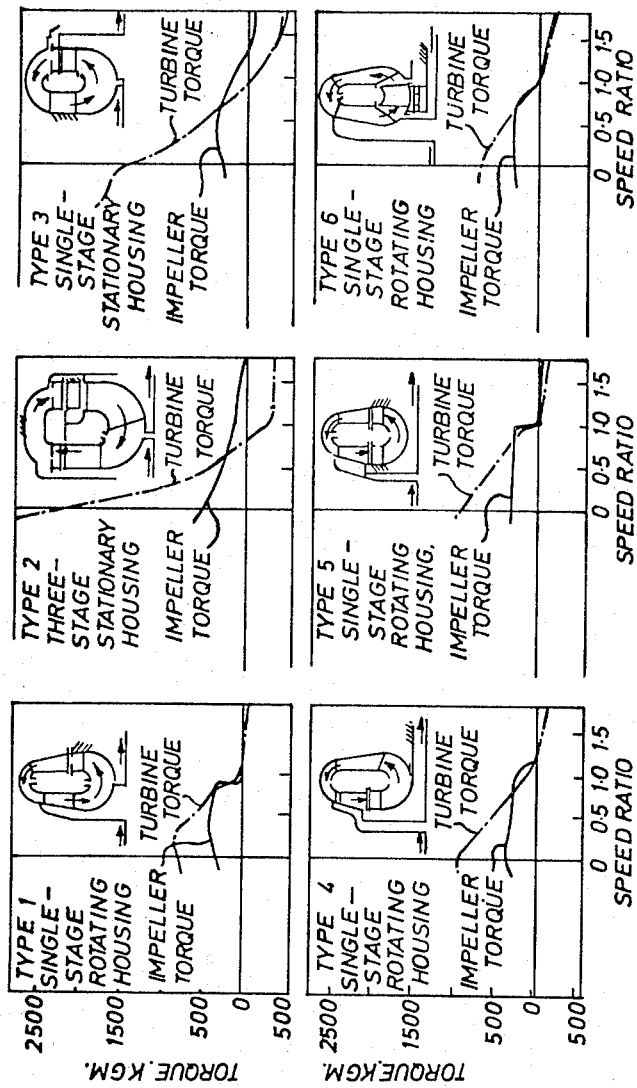

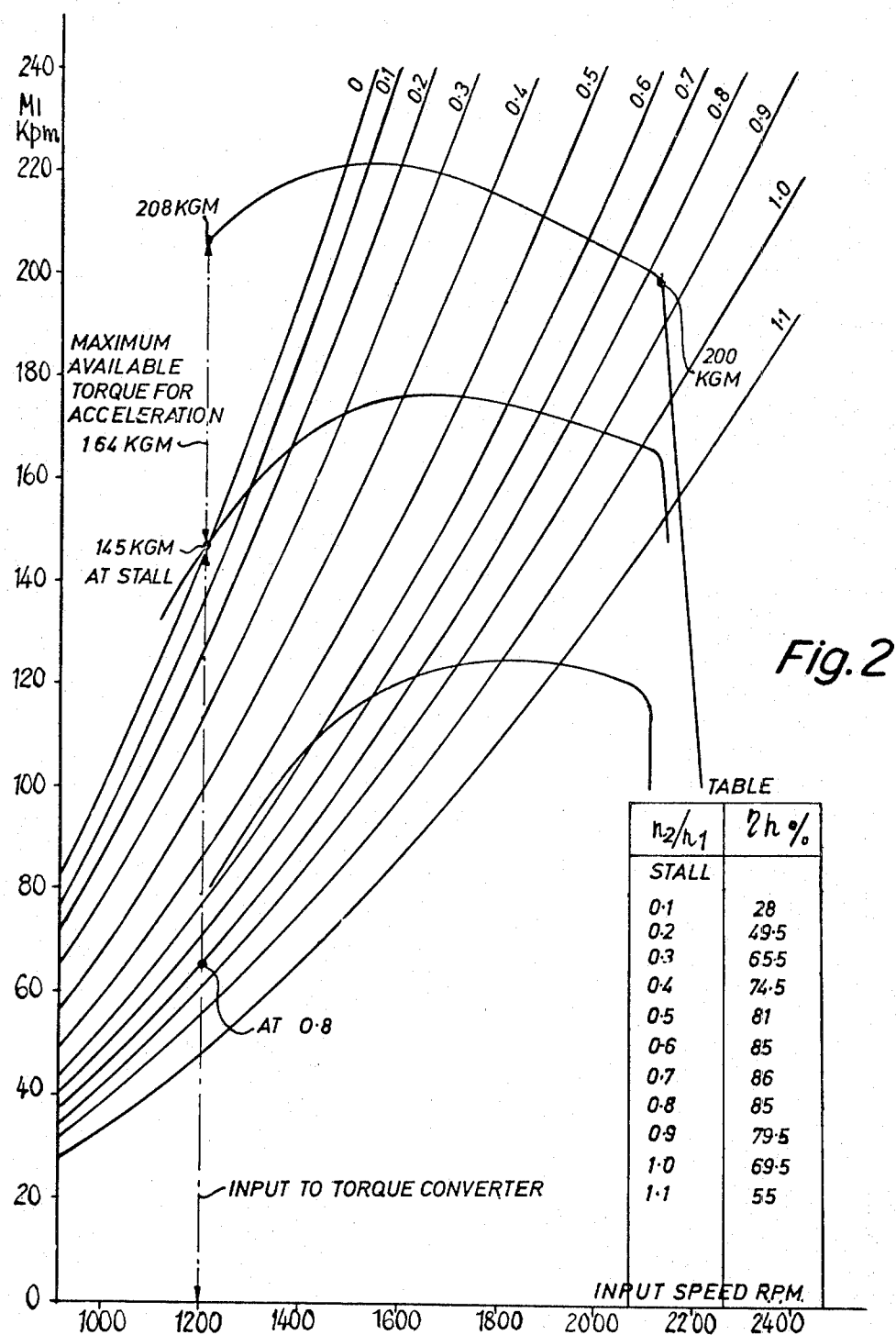

| $n_2/n_1$ | $\eta_h$ % |
|---|---|
| 0 | STR 30 |
| 0.05 | 14.6 |
| 0.10 | 28.1 |
| 0.20 | 51 |
| 0.30 | 65.5 |
| 0.40 | 76.0 |
| 0.50 | 80.0 |
| 0.60 | 84.5 |
| 0.70 | 85 |
| 0.80 | 84.5 |
| 0.90 | 80 |
| 1.00 | 70 |

$$\frac{M_{I\,STALL}}{M_I\,n_2/n_1\,0.8} = 2.5$$

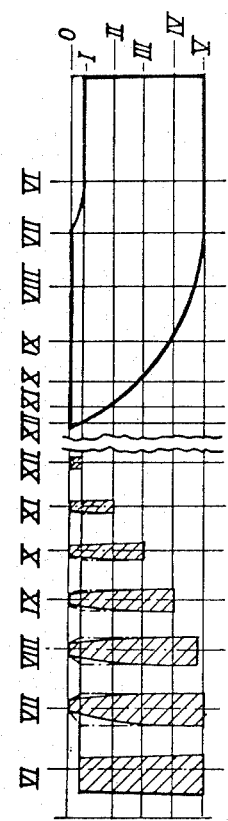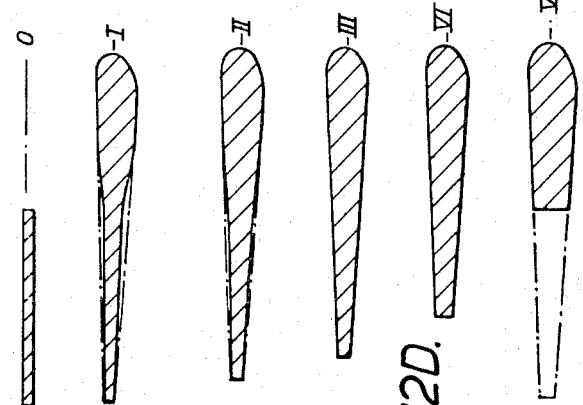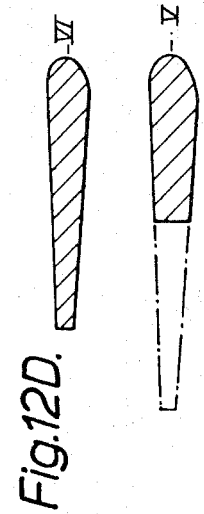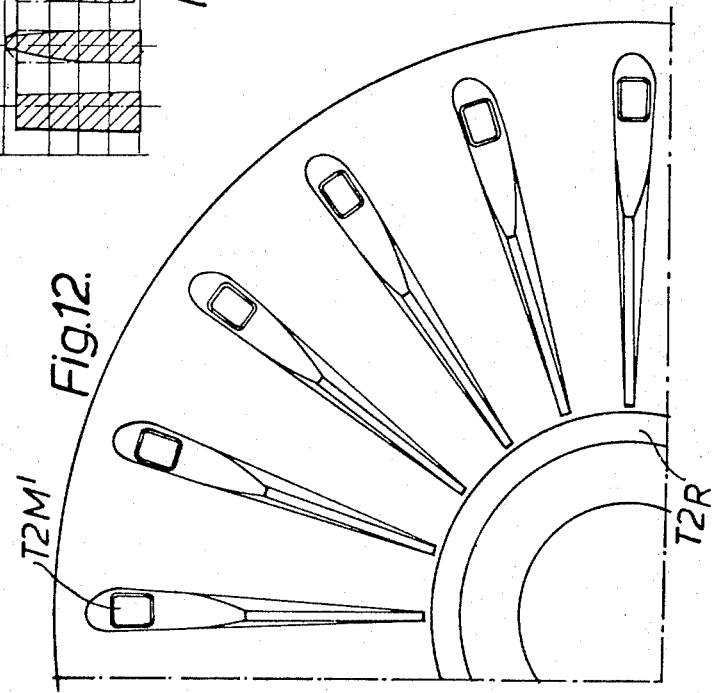

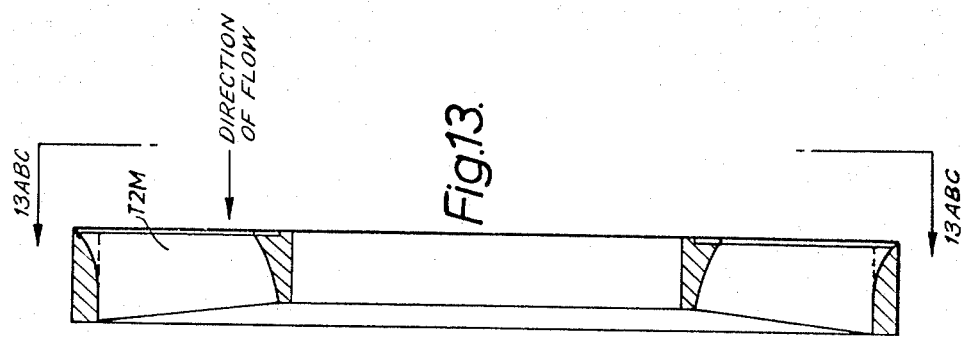
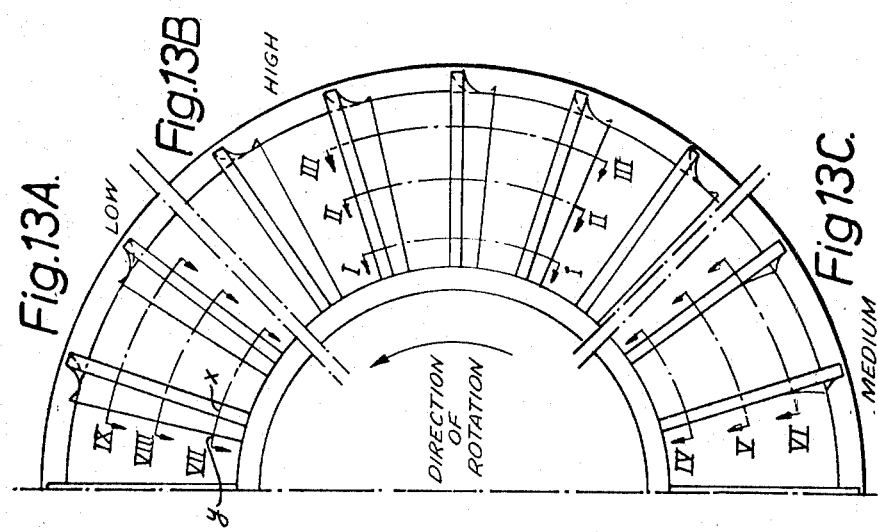
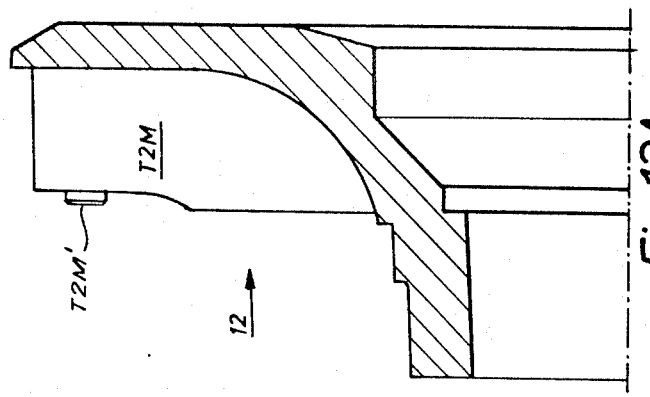

United States Patent Office 3,717,996
Patented Feb. 27, 1973

3,717,996
HYDRODYNAMIC TORQUE CONVERTERS
Karl Gustav Ahlen, Stockholm, Sweden, assignor to S.R.M. Hydromekanik AB, Stockholm-Vallingby, Sweden
Filed Aug. 13, 1971, Ser. No. 171,636
Claims priority, application Great Britain, Mar. 5, 1971, 6,155/71
Int. Cl. F16h 41/04
U.S. Cl. 60—327                        26 Claims

ABSTRACT OF THE DISCLOSURE

This specification describes a hydrodynamic torque converter in which a ring of pump blades, a ring of guide blades and at least two rings of turbine blades are mounted in a toroidal working chamber. The invention enables different input torque characteristics to be obtained by varying the outlet angles of the blades of a turbine ring disposed to immediately precede the ring of pump blades. The outlets of the said turbine blades direct the fluid to the inlet of the pump blades and, for a low input torque ratio, the outlet angle of the said turbine blades is such that the fluid is always directed in the same direction as the direction of rotation of the ring of pump blades.

---

This invention relates to hydrodynamic torque converters.

Hydrodynamic torque converters today are very highly developed machines, when considered both from the standpoint of performance and the standpoint of the techniques used in their manufacture. One problem confronting engineers working in this field is the necessity of having different input torque characteristics for different applications.

The selection of input torque characteristic of a torque converter for a particular field of application depends not only on the type of engine to be used but also on the relationships between the maximum speed of the vehicle required, the maximum engine horsepower and the fully laden weight of the vehicle. Although the foregoing are usually considered to be of prime importance, other factors do, in particular fields of application, have a ruling influence on the desired input torque characteristic.

For instance, in a field of application where, during movement of a vehicle, a high percentage of the engine power is frequently required for accessories, it is not suitable to have a steep input torque characteristic because this in itself, and as now explained, limits the percentage of power available for accessories under driving conditions of the vehicle without stalling the engine. Hitherto, different input torque characteristics have been obtained by using different blade arrangements but, for any particular blade arrangement, only relatively small variations of input torque characteristics have been obtainable.

FIG. 1 shows torque absorption characteristics at different speeds and speed ratios for a known type of torque converter.

FIG. 1A shows schematically six different types of known torque converters and their torque absorption characteristics.

FIG. 2 shows normal torque absorption at different speeds and speed ratios for a known type of torque converter.

FIGS. 6–8 are graphs showing torque absorption at different speeds and speed ratios of a torque converter arranged for high, medium and low input torque ratios, respectively.

FIG. 12 illustrates the two-dimensional part of the second ring of turbine blades of FIG. 11 in greater detail.

FIG. 12A is a cross-section of a turbine hub with a two-dimensional blade.

FIG. 12B is an elevation of a blade of the first part of the second turbine ring and FIGS. 12C and 12D show various sections of the blade taken along similarly numbered section lines of FIG. 12B.

FIG. 13 is a cross-sectional view showing the second and three-dimensional part of the second turbine.

FIGS. 13A, 13B and 13C are elevation views of three different three-dimensional blade formations.

In order to illustrate the foregoing, reference will now be made to FIGS. 1, 1A, 2, 2A, 3, 4 and 5 of the accompanying drawings.

FIG. 1 shows torque absorption at different speeds and speed ratios $n_2/n_1$ of a torque converter with a blade system having a stationary blade row in the working chamber delivering fluid to the entrance of the pump and giving low input torque ratio. In the speed ratio $n_2/n_1$, $n_1$ is the speed of the pump and $n_2$ is the speed of the turbine. FIG. 1 also shows the torque speed characteristic of an engine suitably matched by the torque converter and a certain percentage reduction of the engine torque. This demonstrates that with a low input torque ratio, a high percentage of power can be used for accessories having the torque converter connected for driving the vehicle without stalling the engine. For the examples given with a peak point of 0.8, 50% of maximum engine torque power is available for driving accessories without stalling the engine.

FIG. 1A shows six different types of torque converters currently manufactured by the same manufacturer, and their different torque absorption characteristics demonstrating that completely different blade systems have been used to obtain essential variations of input torque characteristics.

FIG. 2 shows normal torque absorption at different speeds and speed ratios of a torque converter having a blade system with a turbine preceding the pump inlet in the working chamber for producing a high input torque ratio and also the torque curves of an engine suitably matched by the torque converter and the engine torque curve with certain percentual reductions. This demonstrates that even with a peak point of 0.8, only 30% of maximum engine torque is available for accessories before the engine is stalled and, considered in relation to power, the difference is still larger due to the difference in speed between the torque balance port.

Figure 2A:
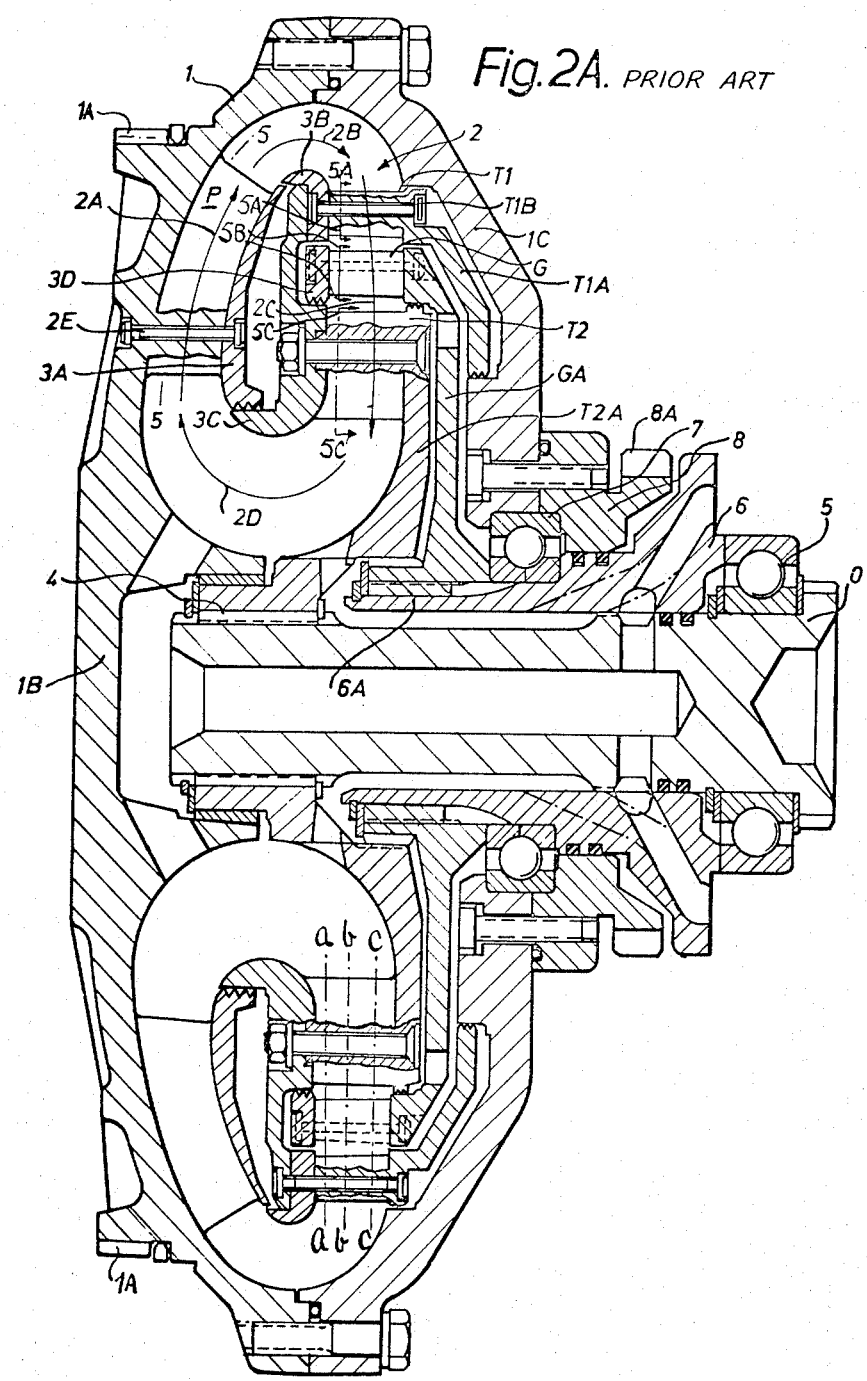
FIG. 2A is a longitudinal sectional view of a conventional torque converter.

FIG. 2A shows in longitudinal cross-section a conventional torque converter, commonly referred to as an SRM torque converter designed by the present applicant.

The converter has a rotable and split casing 1 containing a toroidal chamber 2 for a working fluid. The toroidal chamber consists of an outflow part, an outer transition region, an inflow part and an inner transition region represented by arrows 2A, 2B, 2C and 2D respectively. The direction of the arrows indicate the directions of fluid flow but do not, of themselves, indicate the precise extent of the corresponding parts and regions which fare naturally into one another. The casing is directly or indirectly connected to a prime mover via splines 1A.

Within the toroidal chamber there is mounted a blade system consisting of a ring of pump blades P mounted in the outflow part 2A whereas first and second rings of turbine blades T1 and T2 and a ring of guide blades G are mounted in the inflow part 1C. The pump blades P are cast integrally with part 1B of the rotatable casing 1A and secured by bolts 2E to part 3A of an inner core.

The first ring of turbine blades T1 are cast integrally with an annular member T1A and, in a similar manner, the guide blades G and the second ring of turbine blades T2 are cast integrally with annular members GA and T2A. The blades of the first turbine ring T1 are secured by bolts T1B to part 3B of the inner core whereas the blades of the second turbine are, in similar manner, bolted to part 3C of the inner core. The blades of the guide ring G are bolted to an annular disc 3D which constitutes a fourth part of the inner core.

The annular member T2A which carries the blades of the second ring of turbine blades is connected to output shaft O by a spline connection 4. The output shaft is supported on a roller bearing 5. Surrounding the output shaft O is a hollow shaft 6 which is connected to the annular guide member GA by a spline connection 6A. The hollow shaft 6 supports a roller bearing 7, the outer race of which supports part 1C of the split rotatable casing 1C. Bolted to the part 1C and sealingly cooperating with the hollow shaft 6, is an annular gear element 8 having gear teeth 8A.

Figure 3:
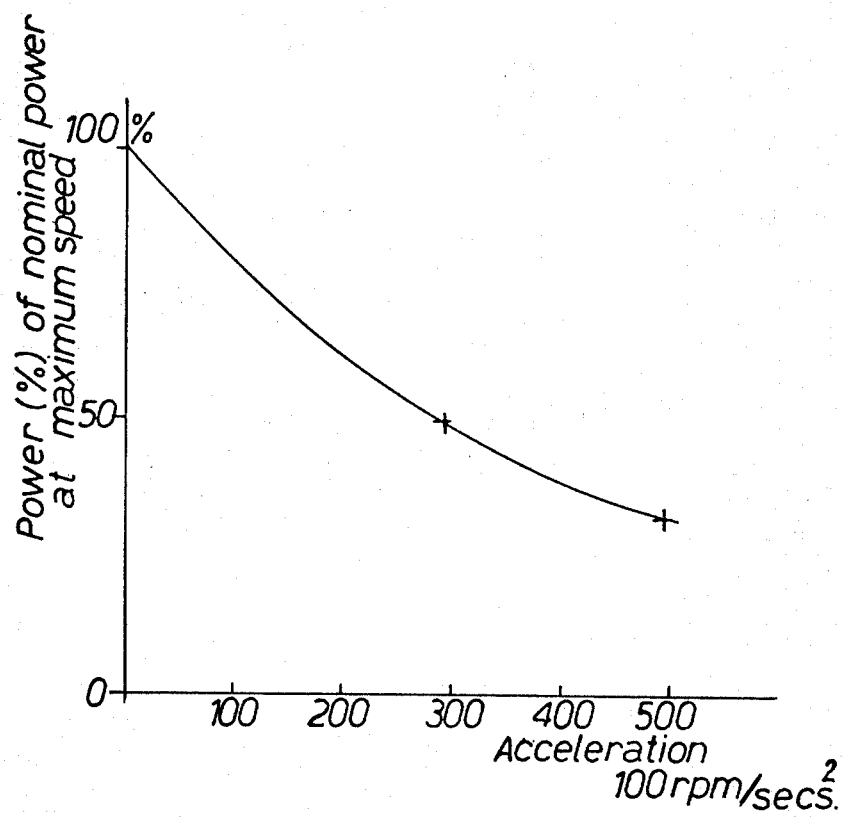
FIG. 3 is a graph showing the reduction of power output due to different accelerations of the engine.

FIG. 3 shows the reduction of output power due to different accelerations of the engine to be taken into consideration when calculating acceleration of the vehicle.

Figure 4:
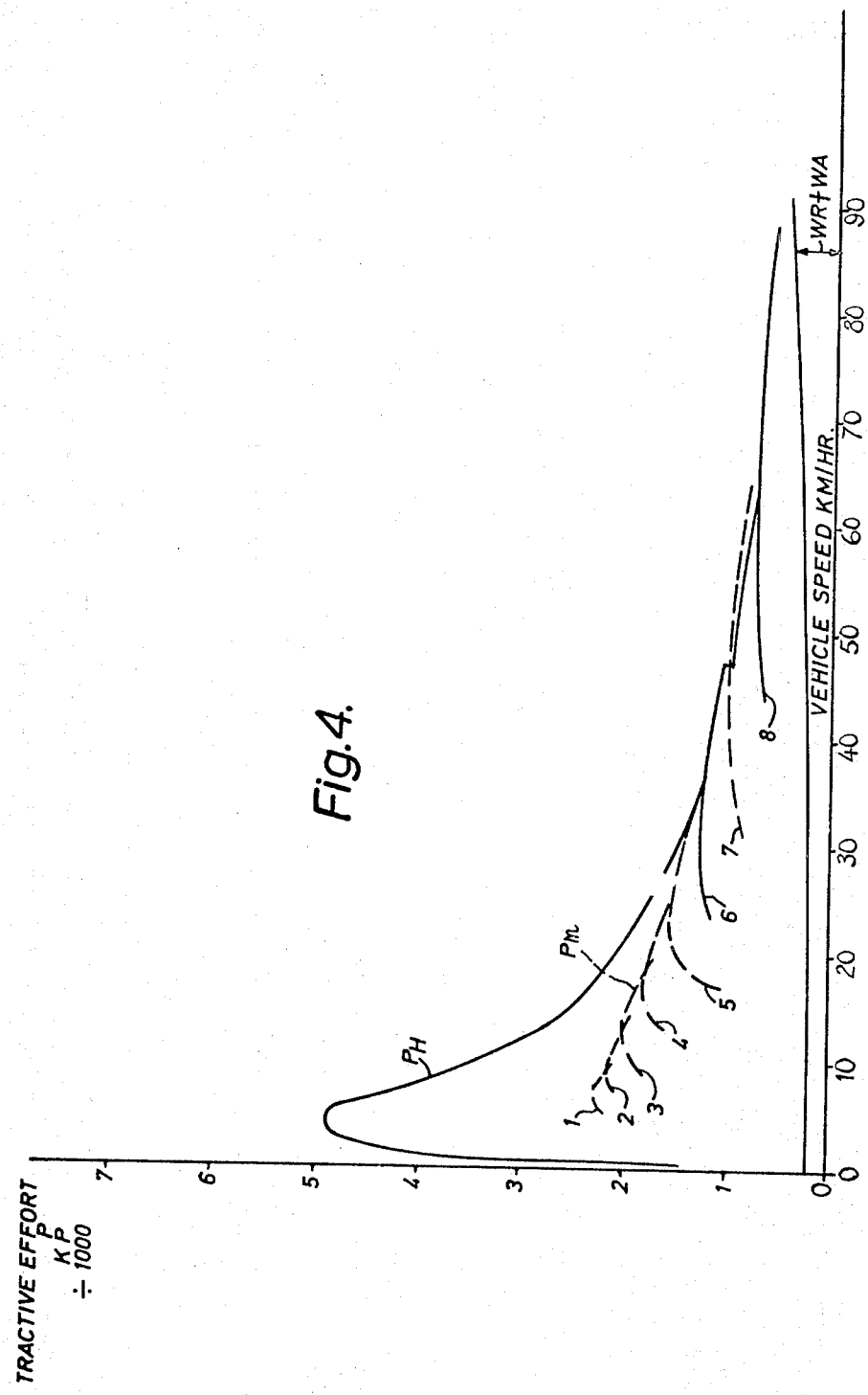
FIG. 4 is a curve showing a comparison in tractive effort obtained under acceleration for a certain type of engine.

In FIG. 4, a curve $P_H$ shows a comparison in tractive effort obtained under acceleration on a zero grade or level surface for a 25 ton vehicle having a 240 HP engine and a mechanical 8-speed gear transmission and alternatively a hydraulic transmission of the SRM fully automatic type with correct input torque characteristic for the case. FIG. 4 also includes a curve R in which the ordinate is represented by the summation of $W_R$ and $W_A$, that is the rolling resistance and the air resistance of the vehicle.

Figure 5:
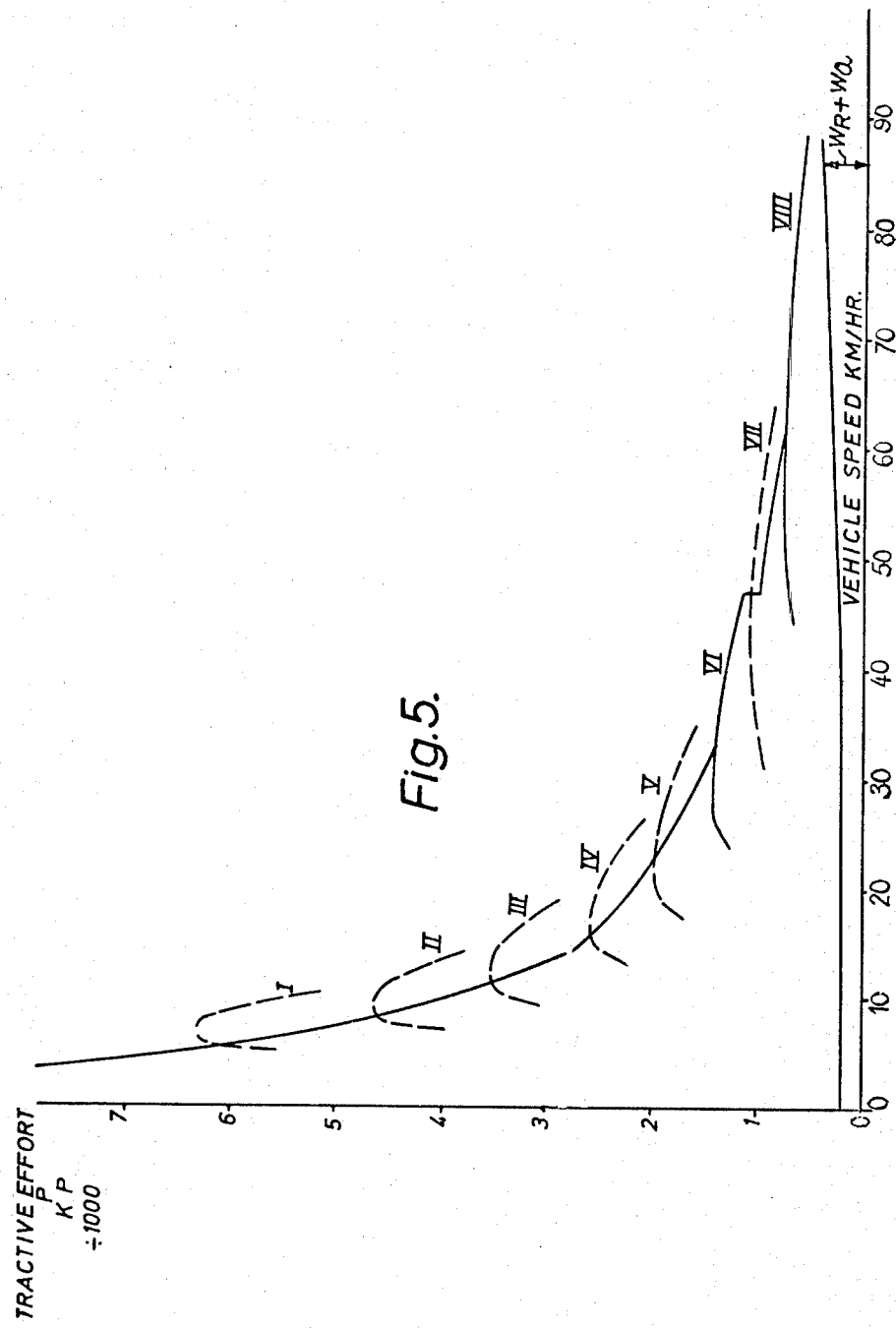
FIG. 5 is a graph similar to FIG. 4 but showing by comparison constant speed conditions.

FIG. 5 shows a comparison made under constant speed conditions, conditions which for all practical purposes never exist.

With a hydraulic torque converter having a flat input torque characteristic it takes a longer time to reach the point where the engine torque is balanced by the torque absorption of the converter than for a torque converter with a high input torque ratio taking up full engine power at a lower speed.

On the other hand a low input torque characteristic gives a slightly higher tractive effort in the central part of the low speed field. A high input torque ratio gives, on the other hand, better maneuverability of the vehicle. Taking all these factors into consideration, the conclusion is clear that a heavy vehicle with a low horsepower weight with high horsepower weight ratio and perhaps requiring ing maneuverabilty at low speeds should have a torque converter with low input torque ratio whereas a vehicle with high horsepower weight ratio and perhaps requiring good maneuverability needs a high input torque ratio.

FIGS. 4 and 5 demonstrate the influence of engine acceleration on tractive effort development both for a torque converter application with suitable input torque characteristic and for application having mechanical gears. In this case a torque converter having a high input torque ratio is used and, therefore, the limitation of tractive effort due to acceleration of the engine with the torque converter is small.

It is believed that the above outline shows at least certain different factors influence the selection of input torque characteristic and, at the same time clearly indicates that it would be of high value if, after calculating mathematically to torque characteristic required for particular application it was possible simply to adjust the blade system to produce the required torque characteristic instead of having to make a selection between different types of available torque converters which has hitherto been the case.

Highly supercharged diesel engines are sensitive if full horsepower is taken off in more than a rather limited speed range, for example, in some cases only full power absorption of the torque converter is allowed at speeds not lower than 10–15% below maximum speed of the engine.

Another application may require an engine with practically constant power over a wide range and with minimum fuel consumption at 75–80% of the maximum speed. Such an application would require a torque converter input torque characteristic which holds down the engine speed at stall by at least 10% below the point where the engine power starts to reduce considerably with reduced speed.

The engine characteristic in itself, however, is as said above not enough for the selection of torque converter input torque characteristic. In case the vehicle has a high horsepower to maximum weight ratio and a comparatively low maximum speed, then the acceleration and adaption time for the engine itself influences the acceleration of the vehicle in such a way that a torque converter blade system giving very low stall speed to the engine will give the best acceleration of the vehicle.

Circumstances surrounding the situation under review will now be considered in connection with the following examples:

At the start of a diesel locomotive the engine accelerates to full speed for only a relatively small part of the total acceleration time. Here, therefore, the engine should possess a comparatively high stall speed giving maximum input power to the torque converter over the whole acceleration period. However, also the selected engine must be taken into consideration. If the engine is highly supercharged, a practically constant engine speed during the acceleration of the train is suitable. If, instead, the engine has practically constant power from top speed down to for instance 80% of the top speed and better fuel consumption at the lower end, then obviously such input speed development in relation to speed at full power is advisable as one giving a stall speed of about 75% or even lower. Obviously, for the locomotive, low input torque variation of the torque converter is normally most suitable, but it is clearly desirable for a user to be able to select the converter with the correct input torque ratio.

If it is instead a question of a railcar application, a more steep input torque characteristic would be preferred as the acceleration of the train would be less noisy but also because a better utilization of the engine power would normally be a result of a slightly higher input torque ratio of the torque converter than for the locomotive.

For earth moving vehicles obviously different applications need different input torque characteristics. For a power shovel for instance, a low input torque characteristic like the one for the locomotive is the best one. For a dumper, on the other hand, doing much acceleration work, a fairly steep input torque characteristic is desirable. For a fork lift truck like the power shovel doing much lifting work and acceleration of the vehicle also, a flat input torque characteristic is needed. For a truck or lorry a fairly high input torque characteristic is mostly, but not always, the one to select as it depends also on the type of engine and the type of combination of mechanical gear and torque converter. For a passenger car it is essential to have a very high input torque ratio, otherwise, when the driver should depress the throttle pedal, there would be a delay before the vehicle started to accelerate. It is commonly known that for a passenger car with automatic transmission a stall s peed of not higher than 50% more than the idling speed is commonly used. Also for a delivery truck a steep input torque characteristic is necessary, because it will give the best maneuverability.

While the above indicates that different applications require different input torque characteristics there is, when one considers efficiency and stall ratio, mainly one requirement, namely, a higher stall torque ratio, and the wider efficiency range (utility ratio), the better. Also, of course, high peak efficiency is of high value but not extremely important.

The above problem has sometimes been solved by using, for different applications, different types of torque converters having different input torque characteristics, as shown in FIG. 1A. There have also been demands within certain types of torque converters to vary the type and number of bladed components to obtain a variation in input torque ratio. Up to now, however, the result has always been a very limited variation in input torque and it has usually demanded three-dimensional blade profiles, or there have been different types of torque converters so called 1½–2½-stage torque converters for low input torque ratios or 2- or 3-stage torque converters to obtain a fairly steep input torque characteristic. In addition, so-called converter couplings are known and these are sometimes used as couplings in a large part of the acceleration field. This arrangement gives the impression of a steep input torque characteristic, but as far as the torque converter itself is concerned, the torque converter has a low input torque characteristic—see FIG. 1A.

The problem to which a solution has been required for the last 30 years is the provision in a torque converter of one single blade system or a blade system in which the exchange of one single component for influencing the torque absorption characteristic can be made without influencing other advantages features of the torque converter.

In the above, there is demonstrated the features and drawbacks of different input torque characteristics obtainable using different known blade systems. The necessity for these different input torque characteristics is demonstrated by the fact that the same torque converter manufacturer produces different blade systems for obtaining different input torque characteristics. It is an object of the present invention to solve the long standing problem of varying the input torque characteristic using, in principle, the same blade system only, varying for instance, one bladed component. Achievement of this aim allows a manufacturer to concentrate capital investment in tools into a single type of blade system except for the variation of the said one bladed component, thereby reducing manufacturing costs and simultaneously satisfying a larger potential market. Furthermore, achievement of this aim will give not only the customer but also the manufacturer the facility of a more unified or rationalized store of converters and spares.

The aim of the present invention is attained in an unconventional way and is directed primarily but not necessarily, to modifying one particular row of converter blades, for example, a row of turbine blades hitherto producing a high input torque ratio.

According to a first aspect of the invention there is provided a hydrodynamic torque converter having a toroidal working chamber comprising an inflow part and outflow part and inner and outer transition regions connecting the inflow and outflow parts, a ring of pump blades in the outflow part and a ring of guide blades and at least two rings of turbine blades in the inflow part characterized in that different input torque characteristics are obtained by using different outlet angles of the blades of the turbine ring immediately preceding the pump ring for directing the flow of fluid to the inlet of the pump blades and in that for a low input torque ratio the outlet angle of the second turbine is such that the fluid is always directed in the same direction as the direction of rotation of the ring of pump blades.

Preferably, the outlet edges of the blades of the turbine ring immediately preceding the pump ring are located in the inner transition region of the toroidal chamber. For low input torque ratios this arrangement contributes to a reduction of the input torque ratio by, for example, making the speed of the fluid less when the outlet edges of the blades are on a smaller radius than when outlet edges of the blades are on a larger radius.

The outlet angle of each turbine blade in the said turbine ring considered relative to a radial plane passing through the inlet of the blade may be such that the distance of the tip of the blade outlet from the said plane does not exceed the distance between any two adjacent blades considered at a particular radius.

Conveniently, at least the outlet portion of each blade of the said ring of turbine blades is shaped so that the outlet direction hereof is directed in the direction of rotation of the ring of turbine blades for a low input torque and in a direction opposite from the said direction of rotation for a high input torque ratio.

The foregoing unconventional arrangement of turbine blade profile in a blade system has solved the problem of eliminating the necessity of a basically different blade arrangement and opened the possibility to use only one blade arrangement for all input torque ratios necessary for different fields of application. Obviously, this effect must have been highly desired during the last forty years because it would have saved manufacturing costs and tool investment costs. But, in spite of its basic simplicity, the concept of the present invention has escaped those working in this field. This is probably due, from calculation standpoint, to the fact that blade systems are complicated and the effect of a certain variation is difficult to foresee even when normal modifications are made. However, the modification in question is a departure from current thinking and from normal design principles and, consequently, the resultant effect is even more difficult to appreciate.

The present invention has solved the problem and has at once made it possible to use the well-known SRM 2-stage blade system without losing in the performance of each individual Ms range and without diminishing the Ms range to vary the input torque ratio from practically the same torque absorption at stalling as the torque absorption at shift point up to three times higher torque absorption at stalling as at shift point.

The invention will now be described by way of example with reference to the accompanying drawing.

FIG. 2A, as mentioned, shows a torque converter of the SRM type having a pump P of the centrifugal type and a turbine T of the centripetal type.

Figure 10:
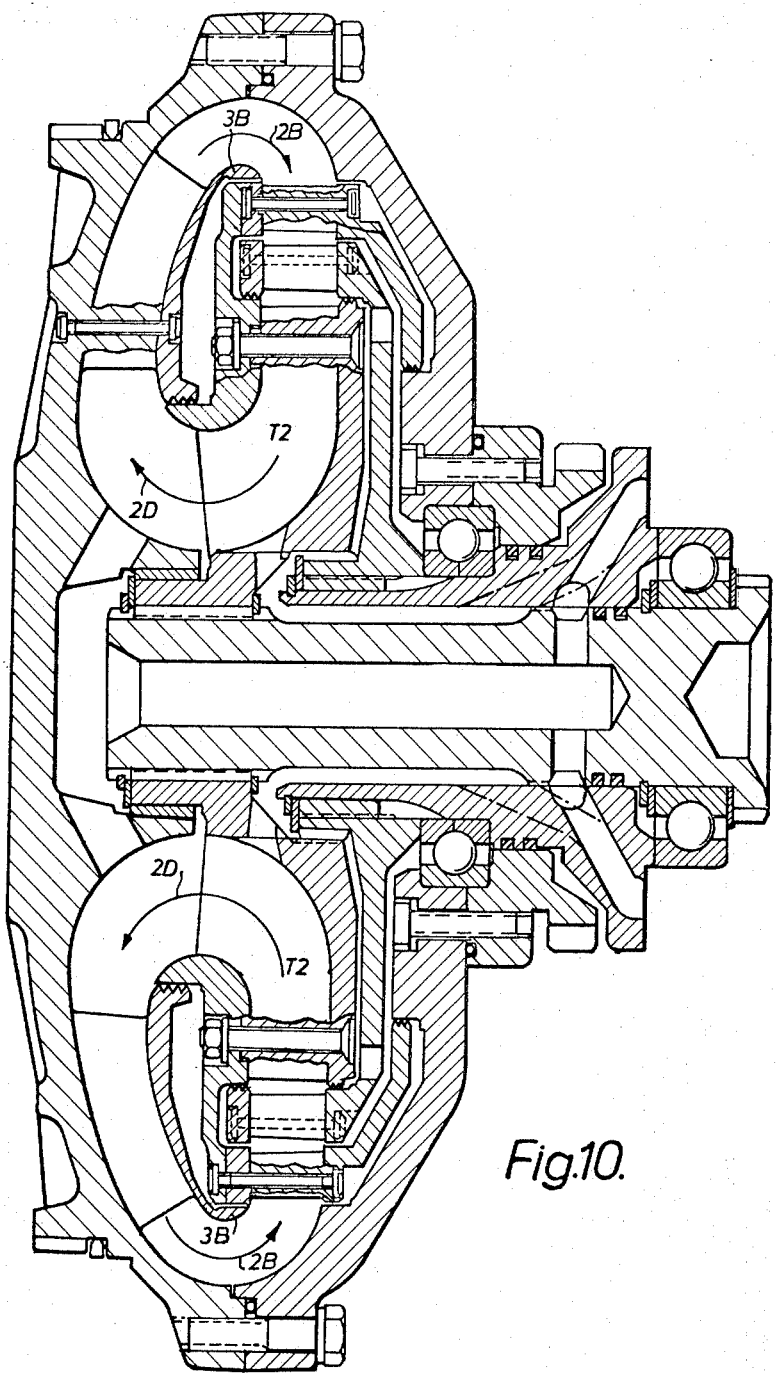
FIGURE 10 is a longitudinal section view through a torque converter modified to include features of the present invention.

FIG. 10 shows the same torque converter re-arranged to make it possible to make modifications according to the invention to obtain different input torque ratios only by varying one blade part, namely the second turbine ring T2. The second turbine T2 has here been extended into the inner transition region 2D, while also the inner core ring of the pump is extended at 3B through the outer transition region 2B. The extension of the second turbine blade is one way in which the invention may be put into practice.

Figure 11:
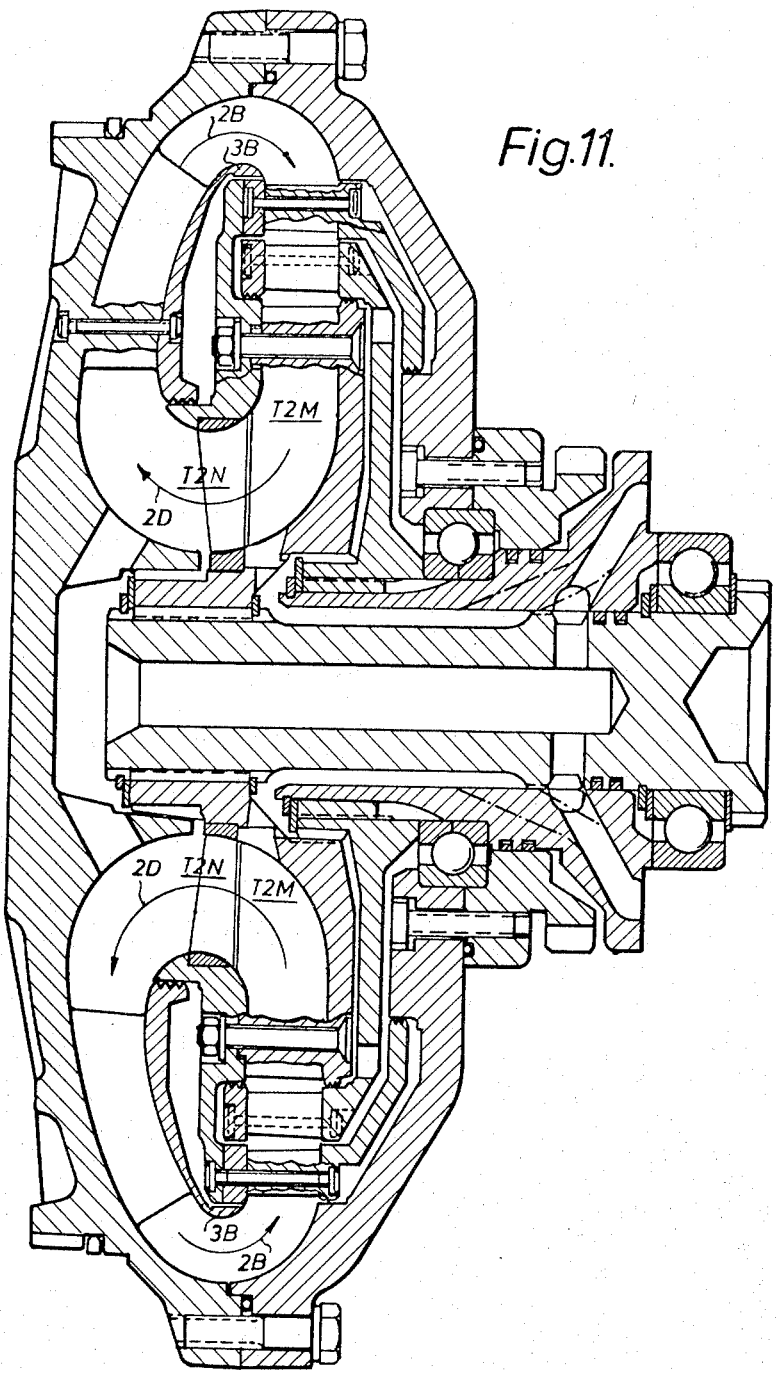
FIG. 11 shows a longitudinal sectional view of a torque converter similar to FIG. 10 but showing a further modification of the invention.

FIG. 11 shows the torque converter according to FIG. 10, modified to make it easier to implement the invention. In this embodiment the second turbine is divided into two parts, T2M and T2N, of which T2M is principally radial and two-dimensional, and T2N is principally axial and three-dimensional as described in my corresponding U.S. patent application Ser. No. 168,826. By dividing the second turbine it is not only easier to implement the present invention but it is thereby also possible to simultaneously combine with this invention the features of the torque converter of the invention described in my said U.S. patent application No. 168,826.

In this specification, the term "two-dimensional" means that the blades are tapered only in one direction along their length and the cross-section of the blades taken in planes normal to the major axes of the blades are of normally the same basic form differing only in size as the blades taper. The two-dimensional blades are sometimes referred to as "single-curvature" blades.

In this specification also, the term "three-dimensional" means that, in addition to the blades having similar or different cross-sections at different positions along the length of the blades, elemental transverse sectional portions of the blades may be angularly displaced relative to the longitudinal axis (which may be curved or linear) of the blades so as to create a twisted appearance which may, in certain cases, be similar to that of an aircraft or ships' propeller blade. The three-dimensional blades are sometimes referred to as "double-curvature" blades.

The two-dimentional blades of the first part of the second turbine ring are preferably manufactured using die-casting techniques and the amount of taper along the length of the blades may simply be the "draw" or "draft" necessary for withdrawal of the blades from the moulds after casting. Preferably, the two-dimensional blades are cast integrally with an annular support having a shape which conforms to the shape of the appropriate part or parts of the toroidal working chamber in which the first part is disposed.

The three-dimensional blades of the second part of the second turbine ring may be manufactured by any known precision casting process such as lost-wax process. However, due to the fact that this blade ring has radial blades which do not overlap, it can be die cast or cast using any normal process without cores even though the blades are three-dimensional. Thus, in effect, a three-dimensional second turbine is obtained without casting using cores of the ring being assembled from a number of individual components. Conveniently, the blades of the second part, which may be steel or an alloy steel, are cast integrally with at least one annular and, preferably, two annular blade supports thereby permitting one second part to be readily exchanged for another in accordance with the inlet conditions necessary for the other blade rings to achieve performance in a required torque absorption range. The annular blade supports for the three-dimensional blades of the second part are, conveniently, and in a similar way to the annular support for the blades of the first part, shaped to conform to the shape of the appropriate part or parts of the toroidal working chamber in which the second part is disposed.

FIG. 12 is an end view of the two-dimensional part T2M of the second turbine when viewed in the direction of arrow 12 in FIG. 12A which shows a cross-section of the turbine hub and one T2M blade. FIG. 12B shows a view of the blade itself, and sections designated O to XII in FIG. 12D and FIG. 12C are taken along correspondingly numbered section lines in FIG. 12B. The several sections shown in FIGS. 12D and 12C give a good picture of a suitable form of the blade T2M and, also demonstrate that it is possible to die-cast the blade ring because all sections of the blade have the necessary draft.

FIG. 13 shows the second part T2N of the second turbine blade ring, and FIGS. 13A, 13B and 13C show parts of three different blade rings viewed in the direction of flow.

When the blades of the second part of the second turbine are shaped according to any of the sections 13D, 13E or 13F, practically the same torque absorption will be obtained as for the normal SRM converter having a blade system as shown in FIG. 2A and according to the SRM British Pat. No. 1,235,561.

Figure 9:
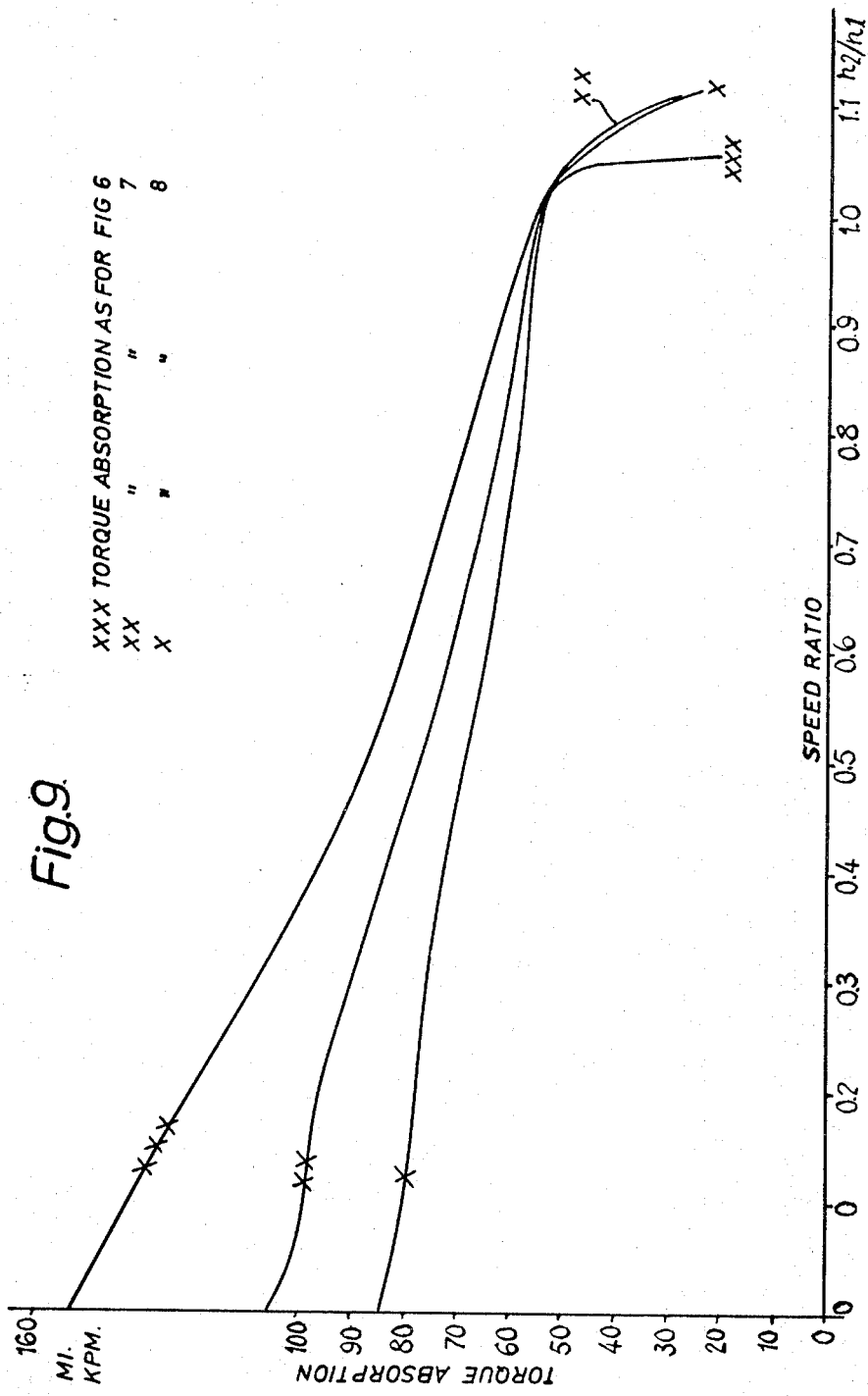
FIG. 9 is a graph showing torque absorption according to FIGS. 6, 7 and 8 versus speed ratio for a constant speed.
Figure 13D:
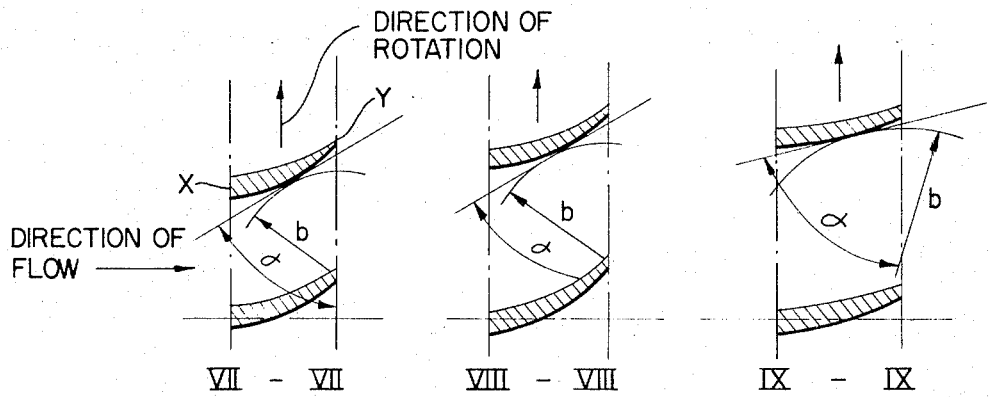
FIGS. 13D, 13E and 13F show sections of the blades taken along the correspondingly marked section lines in FIGS. 13A, 13C, and 13B, respectively.

When the shape of the blade of the second part of the second turbine is modified in accordance with FIG. 13A and with blade sections according to FIG. 13D, a low or gentle steepness of the input torque ratio is obtained as shown in curve X of FIG. 9. When the blade is shaped according to FIG. 13B and with blade sections according to FIG. 13F, a steep input torque ratio as shown in curve XXX, FIG. 9 is obtained. Further, when the blade is shaped according to FIG. 13C and with blade sections according to FIG. 13E, a medium input torque ratio as shown in curve XX of FIG. 9 is obtained substantially without changing efficiency or stall torque ratio and also substantially without changing torque absorption at high speed ratio as shown in FIG. 9. By further modifying the angle $\alpha$ of the FIGS. 13D and 13F input torque ratios from practically 0 up to 3, can be obtained. It will be observed that the angle $\alpha$ is practically the same on the inner section and the middle section but is different on the outer section. This is to remain with the correcting effect of this blade ring, which per se is dealt with in my U.S. patent application Ser. No. 168,826. It will also be observed that, when the blade ring is in accordance with FIG. 13A and the section shown in FIG. 13D, the blades are shaped to give the fluid passing a speed in the same direction of rotation. This means that the preceding guide vane and the following turbine will have the same outlet direction which is not only unconventional but has an obvious and a much preferable effect as is shown in FIG. 9.

Figure 7:
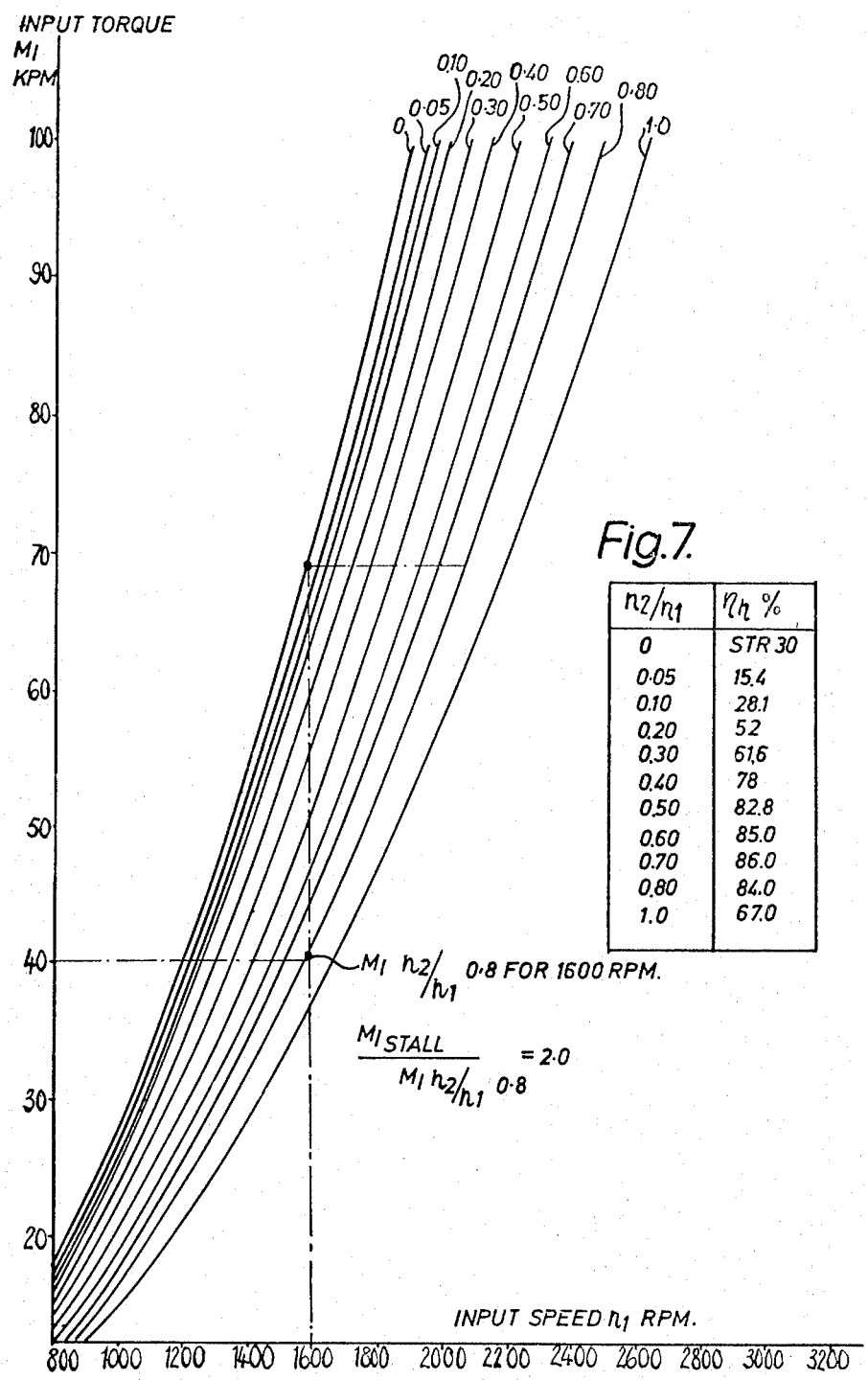
Figure 8:
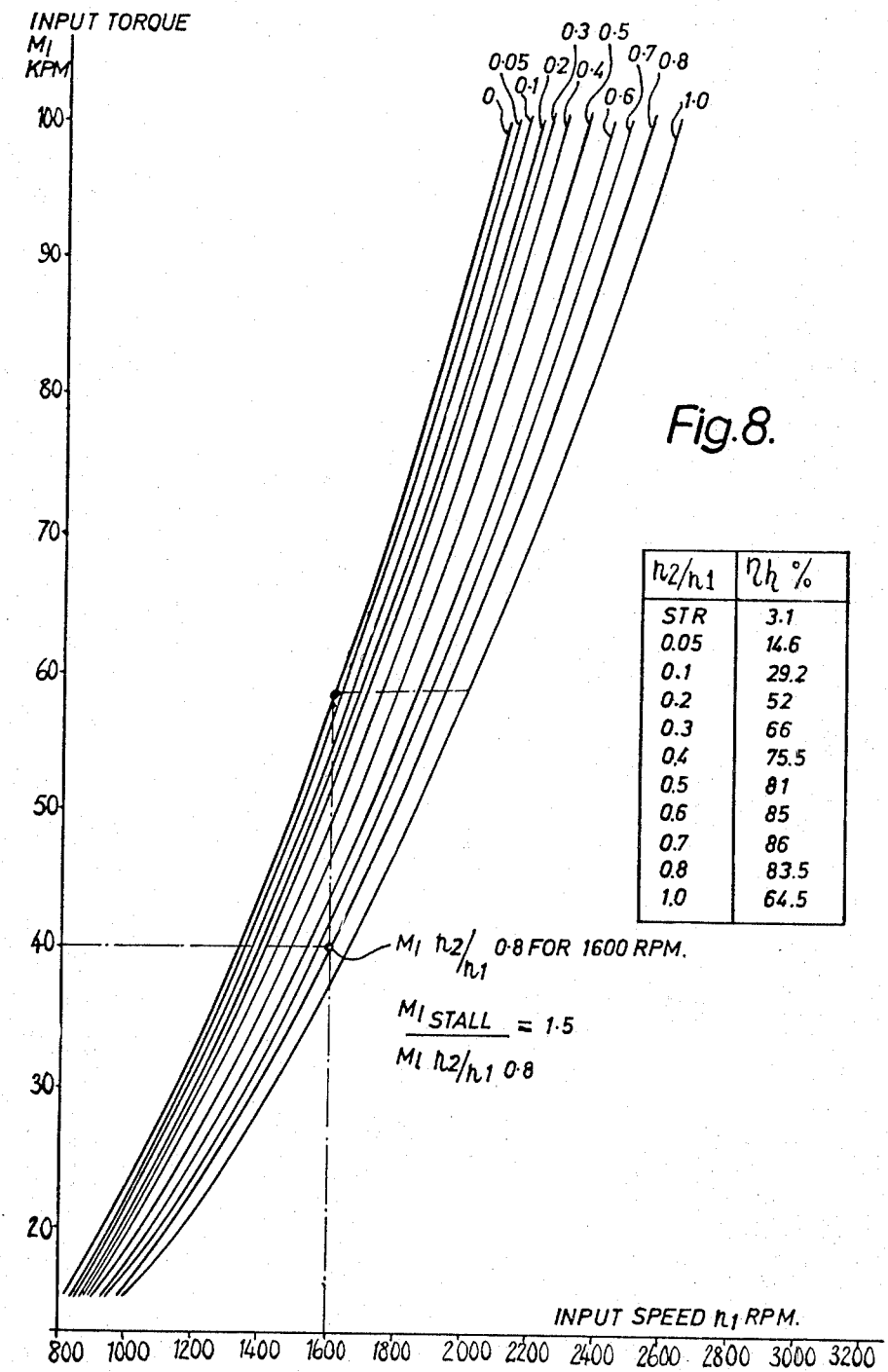
Figure 13F:
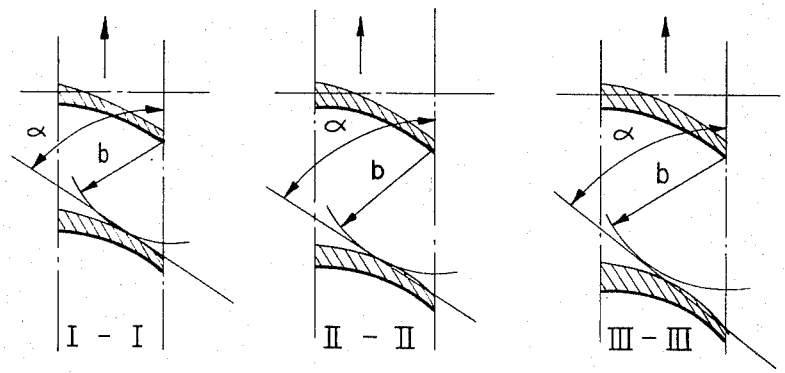
Figure 13E:
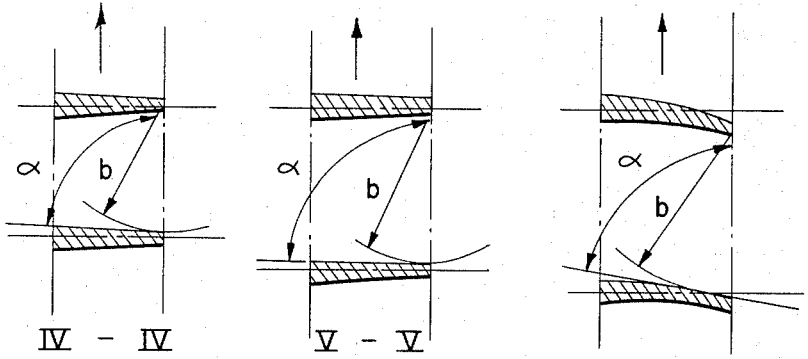

FIGS. 6, 7 and 8 show torque absorption for a torque converter according to FIG. 10 or 11 having the second part of the second turbine according to FIG. 13B, –C or –A respectively. If graphs of an engine curve peaking at 0.8 in speed ratio and torque lines corresponding to different percentage reductions in power are drawn on FIGS. 6, 7 and 8, it will be seen that the blade ring according to FIG. 13A (corresponding to FIG. 8) will give a system less sensitive to reduction of engine power for accessories. It will also be clear that the system with the torque absorption according to FIG. 8 will give a smaller reduction of engine speed at stall in relation to the speed at shift point, that is, a system which is more suitable for a locomotive, a power shovel and a lift truck torque converter. A blade system according to FIG. 13B and with blade sections according to FIG. 13F gives a torque absorption according to FIG. 6 and this will be more suitable for vehicles having a higher power/weight ratio in relation to its torque and speed, such as trucks, railcars, etc. In other words the torque absorption characteristic according FIG. 6 is suitable mainly for high acceleration requirements and that according to FIG. 8 is more suitable for lower acceleration requirements or cases where power must be available for accessories.

The result outlined above has been accomplished in a way which is contradictory to known ways of designing and manufacturing blade systems. In the case of the low input torque ratio the second turbine blade imparts to the fluid a speed in the same direction as the pump when the pump is stalled thereby diminishing the pump pressure head. However, as will be seen from the figures it does not reduce the torque absorption at high speed ratio, due to the fact that the all important value of the angle $\alpha$ is smaller the higher the speed of the turbine and, moreover, at a speed ratio of 1.0 it really does not matter, if the outlet angle $\alpha$ of the second turbine is according to FIG. 13A, 13B or 13C.

Referring again to FIGS, 1, 1A and 2, 2A, these demonstrate the situation before the invention and FIG. 1 when compared with FIG. 2 shows the torque absorption curves for two different types of applications. FIG. 1 shows the performance of a commonly used torque converter for lift trucks and power shovels and the like whereas FIG. 2 shows performance of a blade system according to FIG. 2A (which is of the SRM type) and which is used for buses, trucks, industrial applications and locomotives, but which has been excluded from some applications because it has the wrong input torque characteristics. However, the SRM converter has been used over a wide field owing to its superior efficiency thereby to a certain degree counter-balancing for a too high input torque characteristic for some applications. The torque converter according to FIG. 2 also shows the torque absorption curve for the blade system according to Type 2 of FIG. 1A—the so-called Lysholm/Smith torque converter which is an earlier SRM development manufactured by many firms throughout the world for the same types of applications as the SRM system according to FIG. 2A. Further the balde systems according to Types 1 and 4 of FIG. 1A are earlier SRM developments. The blade systems according to FIG. 1A are manufactured by one of the largest manufacturers of torque converters in the world and such a firm would not manufacture all these variations without reason, because it has certainly increased the cost of each separate transmission and it has not been possible to use the same tools for all converters of the same size. One of the reasons for the existence of these variations is that not only is the input torque characteristic different for each variation but also different characteristics of efficiency and stall torque ratio are obtained.

In applying the present invention to the SRM torque converter blade system according to the U.S. Pats. Nos. 2,690,053, 2,690,054, 3,543,517 (or German Pat. No. 977,211 and German application No. P 1 902 189), the question of varying the input torque characteristic for different kinds of applications is solved by modifying one element in the torque converter blade system without changing the balde system as a whole. Further tooling costs for the one element are relatively cheap.

The present invention also provides a method of putting into practice the inventions described in my earlier U.S. Pats. Nos. 2,853,855 and 3,104,560. In my earlier patents the input torque ratio was modified by having different outlet radii for the blades of the second turbine ring. Where the second turbine outlet edge was on a larger radius a steeper input torque characteristic was required and the method of U.S. Pats. 2,853,855 and 3,104,560 could never be realized because it required a turbine which was partly centrifugal and partly centripetal. Such an arrangement was only suitable for use in a stationary casing and is not applicable to the torque converter of the type now described. Further it required, for a lower input torque ratio, a three-dimensional second turbine which could only be obtained by either casting methods using cores and which did not give sufficient exactness for this type of system, or was to be cast blade by blade which was found to be too complicated at least as far as accuracy in shape was concerned. The present solution provides, in the simplest possible way, various modifications of one single blade system in order to obtain the different input torque characteristics required. At the same time the blades of the blade system have a shape where normal die-casting methods can be utilized for all blade rings. The present invention widens the prospective market for one basic type of torque converter using one set of tools and together with the production methods which can now be used leads to a distinct reduction in production costs per converter as well as obtaining high performance characteristics for each particular application.

What I claim is:

1. A hydrodynamic torque converter system comprising:

means defining a toroidal working chamber comprising, a fluid outflow region in which the fluid flows radially outwardly, a fluid inflow region in which the fluid flows radially inwardly, an inner transition region in which the fluid flows from the inflow region to the outflow region and an outer transition region in which the fluid flows from said outflow region to said inflow region, a ring of pump blades located primarily in the outflow region, a ring of guide blades located in the inflow region, and at least first and second rings of turbine blades, each located at least in part in the inflow region, the second ring of turbine blades immediately preceding the pump blades in the direction of fluid flow, and a means for varying the input torque characteristic of the hydrodynamic torque converter, said means comprising the construction, according to which the outlet angles of the blades of the second turbine ring are changed to vary the direction of the fluid flow to the inlet of the pump blades principally without varying the construction of the pump blades, the guide blades or the first turbine blades, wherein according to said construction, to obtain a medium input torque characteristic, the outlet angles of the blades of the second turbine ring are constructed to direct the fluid axially relative to the blade ring, and wherein, to obtain a low input torque characteristic, the outlet angles of the blades of the second turbine ring are constructed to direct the fluid passing therethrough relative to the blade ring in the same direction as the direction of the rotation of the turbine and pump blades.

2. A hydrodynamic torque converter system according to claim 1, in which the outlet edges of the blades of the second turbine ring are located principally in the inner transition region.

3. A hydrodynamic torque converter system according to claim 1, according to which construction, for a high input torque ratio characteristic, the said outlet angle is constructed such that when the turbine is stationary the fluid is directed in a direction opposite from the direction of rotation of the ring of pump blades.

4. A hydrodynamic torque converter system according to claim 1, including a turbine hub for the second ring of turbine blades and in which the second turbine blade is cast as a part of said turbine hub.

5. A hydrodynamic torque converter system according to claim 1 in which the rings of blades of the second turbine have one two-dimensional portion and one three-dimensional portion.

6. A hydrodynamic torque converter system according to claim 5, in which all the blades other than the said three-dimensional portion of the second turbine ring and the outlets of the pump remain essentially the same for the same torque absorption at shift point for different input torque ratios.

7. A hydrodynamic torque converter system according to claim 1, including an inner pump blade core on the outside, and in which the said pump blade core extends into the said inflow section of the working chamber.

8. A hydrodynamic torque converter system according to claim 7, in which the outlets of the pump blades are located in the said outer transition of the toroidal working chamber to obtain a high $Ms$ range for low input torque ratios.

9. A hydrodynamic torque converter system according to claim 1, in which the blades of the ring of second turbine blades are divided into a first and a second part, the blades of the first part being located principally in the inflow part of the working chamber and being principally two-dimensional and the blades of the second part being located principally in the inner transition region and being principally three dimensional.

10. A hydrodynamic torque converter system according to claim 9, in which the two parts of the second turbine are rotationally fixed relative to each other.

11. A hydrodynamic torque converter system according to claim 9, in which the outlet portion of the second turbine blades is varied along the length of the blade to adjust the direction of fluid flow so as to be substantially the same over the total length of the inlet portion of the pump blades.

12. A hydrodynamic torque converter system according to claim 9, in which the outlet angle of the blades of the said second part are varied along the length of the blades to balance the flow of fluid within the toroidal chamber between different sections thereof so as to obtain minimum losses especially at high and low speed ratios at the turbine and guide blade entrances.

13. A hydrodynamic torque converter system according to claim 9, in which the second part of the second turbine is shaped to displace the flow of fluid to a greater degree at a larger distance from the axis of rotation of the hydrodynamic torque converter than at a smaller distance from the said axis of rotation.

14. A hydrodynamic torque converter system according to claim 9, in which the degree of twist of the three-dimensional blades along its length is larger in the low $M_s$ range than in the high $M_s$ range.

15. A hydrodynamic torque converter system according to claim 9, in which the three-dimensional blades do not overlap adjacent blades in the circumferential direction of the second part of the second turbine ring, thereby rendering possible casting without cores.

16. A hydrodynamic torque converter system according to claim 9, in which the two-dimensional blades are cast together with the hub and have an axial draft relative to the hub suitable for casting or drop-forging.

17. A hydrodynamic torque converter system according to claim 9, in which the second part of the second turbine is made of steel or an alloy of steel.

18. A hydrodynamic torque converter system according to claim 9, in which the said second part is axially fixed between the inner core and the turbine hub and maintained in such a position rotationally in relation to the said first part so that the entrance of the second part overlies the outlet of the first part.

19. A hydrodynamic torque converter system according to claim 18 in which the second part of the second turbine is rotationally fixed both in relation to the inner core and to the turbine hub.

20. A hydrodynamic torque converter system according to claim 9, wherein the blades of the said first part are disposed substantially radially with respect to the axis of rotation of the turbine.

21. A hydrodynamic torque converter system according to claim 1, in which the means for varying the torque characteristics comprises the construction according to which all of said rings of pump blades, first turbine blades and guide blades are constructed to be usable with any one of a plurality of rings of second turbine blades, said plurality of second turbine blades including at least:
 (a) a second ring of turbine blades in which the outlet angles of the blades are constructed to direct the fluid in the direction of rotation of the pump blades for a low input torque characteristic, and
 (b) a second ring of turbine blades in which the outlet angles of the blades of the second ring of turbine blades are constructed to direct the fluid in a direction opposite to the direction of rotation of the pump blades for high torque characteristics.

22. A hydrodynamic torque converter system according to claim 21, wherein said plurality of second ring of turbine blades includes:
 (c) a second ring of turbine blades in which the outlet angles of the blades are constructed to direct the fluid in a direction between that direction of the said low input torque and the said high input torque second ring of turbine blades, thereby obtaining intermediate torque characteristics.

23. A method of operating a hydrodynamic torque converter of the type comprising a toroidal working chamber with a fluid outflow region in which the fluid flows radially outwardly, a fluid inflow region in which the fluid flows radially inwardly, an inner transition region in which the fluid flows from the inflow region to the outflow region and an outer transition region in which the fluid flows from said outflow region to said inflow region, and including a ring of pump blades located primarily in the outflow region, a ring of guide blades located in the inflow region and at least first and second rings of turbine blades, each located at least in part in the inflow region, the second ring of turbine blades immediately preceding the pump blades in the direction of fluid flow, said method comprising the steps of:
 varying the outlet angle of the blades of the second ring of turbine blades to vary the input torque characteristics of the hydrodynamic torque converter relative to the pump ring blades, the first turbine ring blades and the guide ring blades.

24. The method of claim 23 including arranging the outlet angles of the blades of the second ring of turbine blades to direct the fluid passing therethrough in the same direction relative to said blades as the direction of rotation of the pump blades for low input torque characteristics, and arranging the outlet angles of the blades of the second ring of turbine blades to direct the flow in a direction relative to said blades opposite to the direction of rotation of the pump blades for high input torque characteristics.

25. The method of claim 24 including arranging the outlet angles of the blades of the second ring of turbine blades to direct the fluid passing therethrough axially relative to the blade ring for medium input torque characteristics.

26. The method of claim 24, including varying the said outlet angles by interchanging at least parts of the said second ring of turbine blades while maintaining without change the pump blades, the first turbine ring blades and the guide ring blades.

References Cited

UNITED STATES PATENTS

| | | | |
|---|---|---|---|
| 3,205,662 | 9/1965 | Gabriel | 60—54 |
| 3,230,716 | 1/1966 | Gabriel | 60—54 |
| 3,299,636 | 1/1967 | Kronogard | 60—54 |
| 3,543,517 | 12/1970 | Ahlen | 60—54 |

EDGAR W. GEOGHEGAN, Primary Examiner

U.S. Cl. X.R.

60—361